(12) United States Patent
Galamba

(10) Patent No.: US 10,840,681 B2
(45) Date of Patent: *Nov. 17, 2020

(54) THERMAL SLEEVE WITH POSITIONING MEMBER, ASSEMBLY THEREWITH AND METHOD OF CONSTRUCTION THEREOF

(71) Applicant: Federal-Mogul Powertrain, LLC, Southfield, MI (US)

(72) Inventor: Steven M. Galamba, West Chester, PA (US)

(73) Assignee: Federal-Mogul Powertrain LLC, Southfield, MI (US)

( * ) Notice: Subject to any disclaimer, the term of this patent is extended or adjusted under 35 U.S.C. 154(b) by 477 days.

This patent is subject to a terminal disclaimer.

(21) Appl. No.: 15/224,348

(22) Filed: Jul. 29, 2016

(65) Prior Publication Data
US 2017/0033542 A1     Feb. 2, 2017

Related U.S. Application Data

(60) Provisional application No. 62/198,737, filed on Jul. 30, 2015.

(51) Int. Cl.
| | |
|---|---|
| *H02G 3/04* | (2006.01) |
| *B60R 16/02* | (2006.01) |
| *H01B 7/29* | (2006.01) |
| *H01B 19/00* | (2006.01) |

(52) U.S. Cl.
CPC ....... *H02G 3/0412* (2013.01); *B60R 16/0215* (2013.01); *H01B 7/292* (2013.01); *H01B 19/00* (2013.01); *H02G 3/04* (2013.01); *H02G 3/0468* (2013.01)

(58) Field of Classification Search
CPC .. H02G 3/0406; H02G 3/0412; H02G 3/0468; H02G 3/04; H01B 17/184; H01B 17/58; H01B 17/586; H01B 7/0045; H01B 7/292; H01B 7/40; H01B 16/00; H01B 19/00; H05K 5/0213; B60R 16/0215
USPC ............................. 174/74 A, 85, 86, 87, 93
See application file for complete search history.

(56) References Cited

U.S. PATENT DOCUMENTS

| | | | |
|---|---|---|---|
| 2,980,144 A | 4/1961 | Edwards, Jr. et al. | |
| 4,380,686 A * | 4/1983 | Moisson | H02G 15/1806 174/84 R |
| 4,751,350 A * | 6/1988 | Eaton | H02G 15/043 174/74 A |

(Continued)

OTHER PUBLICATIONS

International Search Report, dated Nov. 10, 2016 (PCT/US2016/044952).

*Primary Examiner* — Roshn K Varghese
(74) *Attorney, Agent, or Firm* — Robert L. Stearns; Dickinson Wright, PLLC

(57) ABSTRACT

A thermal sleeve for protecting an electronic member connected to a wiring harness against exposure to heat has a tubular member including an inner layer of insulative material and an outer layer of reflective material. The tubular member extends along a central longitudinal axis between opposite open ends. A plurality of slits extends lengthwise through one of the ends to form a plurality of fingers. The fingers are plastically deformed to extend radially inwardly toward the central longitudinal axis and form an opening for receipt of the wiring harness therethrough.

21 Claims, 3 Drawing Sheets

(56) References Cited

U.S. PATENT DOCUMENTS

| | | | | |
|---|---|---|---|---|
| 4,825,016 | A * | 4/1989 | Meltsch | H02G 15/10 |
| | | | | 174/92 |
| 4,885,429 | A | 12/1989 | Schnittker | |
| 5,046,766 | A * | 9/1991 | Lomberty | F16L 25/0036 |
| | | | | 174/92 |
| 5,947,159 | A * | 9/1999 | Takahashi | F16L 5/04 |
| | | | | 138/128 |
| 6,176,052 | B1 * | 1/2001 | Takahashi | F16L 5/04 |
| | | | | 137/75 |
| 6,194,659 | B1 | 2/2001 | Cornu | |
| 6,278,061 | B1 | 8/2001 | Daoud | |
| 6,978,643 | B2 * | 12/2005 | Akers | F16L 59/029 |
| | | | | 66/170 |
| 2006/0054763 | A1 | 3/2006 | Fryberger, Jr. et al. | |
| 2007/0191755 | A1 | 8/2007 | Sellis et al. | |
| 2009/0311456 | A1 * | 12/2009 | Harris | F16L 59/022 |
| | | | | 428/36.1 |
| 2011/0005807 | A1 * | 1/2011 | Chesnais | H02G 3/0481 |
| | | | | 174/120 R |
| 2013/0292154 | A1 * | 11/2013 | Aoyama | B60R 16/0215 |
| | | | | 174/105 R |
| 2017/0012417 | A1 * | 1/2017 | Teal | G01N 27/4078 |
| 2017/0042049 | A1 * | 2/2017 | DePompeo | H01B 7/292 |
| 2017/0042050 | A1 * | 2/2017 | Woodruff | G01D 11/245 |

\* cited by examiner

THERMAL SLEEVE WITH POSITIONING MEMBER, ASSEMBLY THEREWITH AND METHOD OF CONSTRUCTION THEREOF

CROSS-REFERENCE TO RELATED APPLICATION

This application claims the benefit of U.S. Provisional Application Ser. No. 62/198,737, filed Jul. 30, 2015, which is incorporated herein by reference in its entirety.

BACKGROUND OF THE INVENTION

1. Technical Field

This invention relates generally to tubular sleeve assemblies that provide thermal protection to an electronic object contained therein, and more particularly to a tubular sleeve assembly including a positioning member to maintain the assembly in a selectively releasable, fixed position about the electronic object contained therein.

2. Related Art

Sensors used in automotive applications, such as oxygen sensors which provide data to control engine operation and performance, are often mounted within the engine compartment of a vehicle where they are subject to harsh environmental elements including intense radiant heat, sources of abrasion and vibration during vehicle operation. Due to the harsh environmental elements, it is advantageous, and in many cases a requirement, to cover the relatively delicate, temperature sensitive sensors with protective sleeving in an effort to dampen vibration, provide protection against abrasion and shield radiant heat from reaching the sensor. Such sleeves generally comprise an elongated, cylindrical tube extending between opposite, open free ends. The cylindrical tube includes a damping inner layer of a nonwoven material, for example, polyester felt and a reflective outer layer comprising, for example, an aluminum foil layer laminated to an outer surface of the inner layer.

Due to the configuration of the aforementioned protective cylindrical sleeve and its harsh environment, it is typically difficult to assemble the sleeve about the sensor in a manner which allows the sleeve to be reliably secured and maintained in a desired position, while at the same time being readily removable for servicing of the sensor. Adhesives, tape and interference fits of an entirety of an inner surface of the cylindrical wall of the sleeve are used to effect attachment, but each of these mechanisms suffer various disadvantages. Adhesive attachment of the sleeve about the sensor, while generally secure, at least initially, permanently attaches the sleeve to the sensor, and thus, complicates servicing the sensor at a future time, and in addition, the adhesives can breakdown over time, thereby causing the sleeve to become dislodged from its desired protective position about the sensor. As a result, while in its initially bonded position, this method does not allow for easy removal of the sleeve for servicing of the sensor or reuse of the sleeve, as it requires destroying the bond joint of the adhesive. In addition, tape and interference fits can be unreliable in view of the heat and vibration encountered within the engine compartment, with tapes further being particularly burdensome to apply, and friction fits of an entirety of a sleeve inner surface suffer from variances in component tolerances, and difficulty of assembly, particularly if the interference is too great, or if the sleeve needs to traverse increased diameter obstacles along the path of assembly, such as a connector, for example. Further mechanisms are also known, such as using end caps made from separate materials from the tubular sleeve to position the sleeve; however, this method requires assembly of multiple components to one another in construction of the sleeve, thereby adding complexity and cost to the manufacture and assembly of the insulative sleeve.

SUMMARY OF THE INVENTION

In accordance with one aspect of the invention, a thermal sleeve for protecting an electronic member connected to a wiring harness against exposure to heat is provided. The thermal sleeve has a tubular member including an inner layer of insulative material and an outer layer of reflective material. The tubular member extends along a central longitudinal axis between opposite open ends. A plurality of slits extends lengthwise through one of the ends to form a plurality of fingers. The fingers extend radially inwardly toward the central longitudinal axis and form an opening for receipt of the wiring harness therethrough.

In accordance with another aspect of the invention, the tubular member has a generally cylindrical portion, with the fingers being reverse folded into the generally cylindrical portion.

In accordance with another aspect of the invention, a portion of the reverse folded fingers and the generally cylindrical portion form a dual walled cylindrical region of said insulative material.

In accordance with another aspect of the invention, the insulative material can be provided as one of a nonwoven material, a woven material, a braided material, and a knit material.

In accordance with another aspect of the invention, the outer layer of reflective material can be provided as a metal foil layer fixed to the inner layer of insulative material.

In accordance with another aspect of the invention, a thermal sleeve in combination with a wiring harness configured in electrical communication with a sensor is provided. The thermal sleeve includes a tubular member including an inner layer of insulative material and an outer layer of reflective material. The tubular member extends along a central longitudinal axis between opposite open ends. A plurality of slits extends lengthwise through one of the ends to form a plurality of fingers, wherein the fingers extend radially inwardly toward the central longitudinal axis to form an opening for receipt of the wiring harness therethrough.

In accordance with another aspect of the invention, a method of constructing a sleeve for protecting an electronic member connected to a wiring harness against external thermal effects is provided. The method includes providing a tubular member extending along a central longitudinal axis between open opposite ends, with the tubular member including an inner layer of insulative material and an outer layer of reflective material. The method further includes forming a plurality of slits extending lengthwise through one of the ends toward the other of the ends to form a plurality of fingers. Further yet, the method includes bending the fingers radially inwardly toward the central longitudinal axis, with free ends of the fingers forming an opening for receipt of the wiring harness therethrough.

In accordance with another aspect of the invention, the method includes reverse folding the fingers into the cavity of the sleeve and forming a dual walled region including separate overlying layers of the insulative material.

In accordance with another aspect of the invention, the method includes providing the reflective material by wrapping a foil layer about the insulative material.

In accordance with another aspect of the invention, the method includes providing the insulative material with one of a nonwoven material, a woven material, a braided material, and a knit material.

BRIEF DESCRIPTION OF THE DRAWINGS

These and other features and advantages of the present invention will become more readily appreciated when considered in connection with the following detailed description of presently preferred embodiments and best mode, appended claims and accompanying drawings, in which:

DETAILED DESCRIPTION OF PREFERRED EMBODIMENTS

Figure 1:
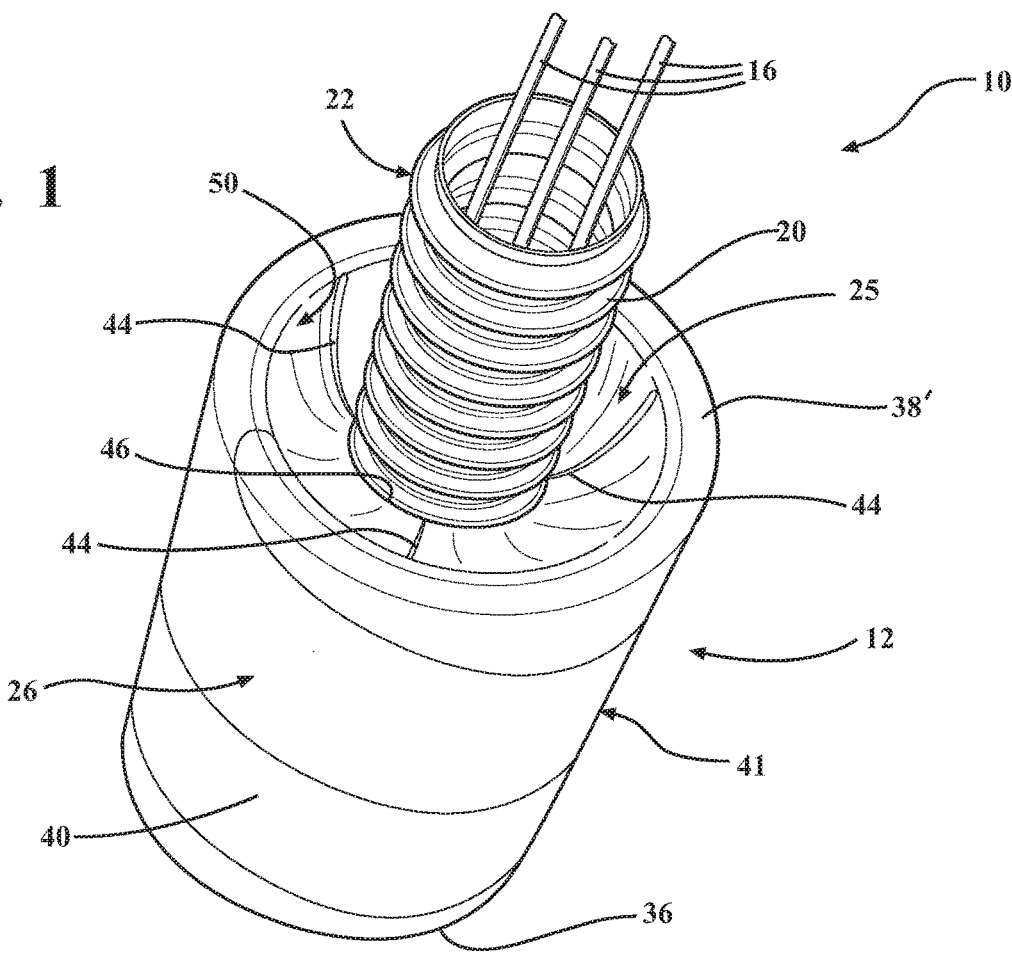
FIG. 1 is an isometric view of a thermal sleeve assembly constructed in accordance with one aspect of the invention for protecting an electrical component shown disposed about a wire harness connected to the electrical component.
Figure 2:
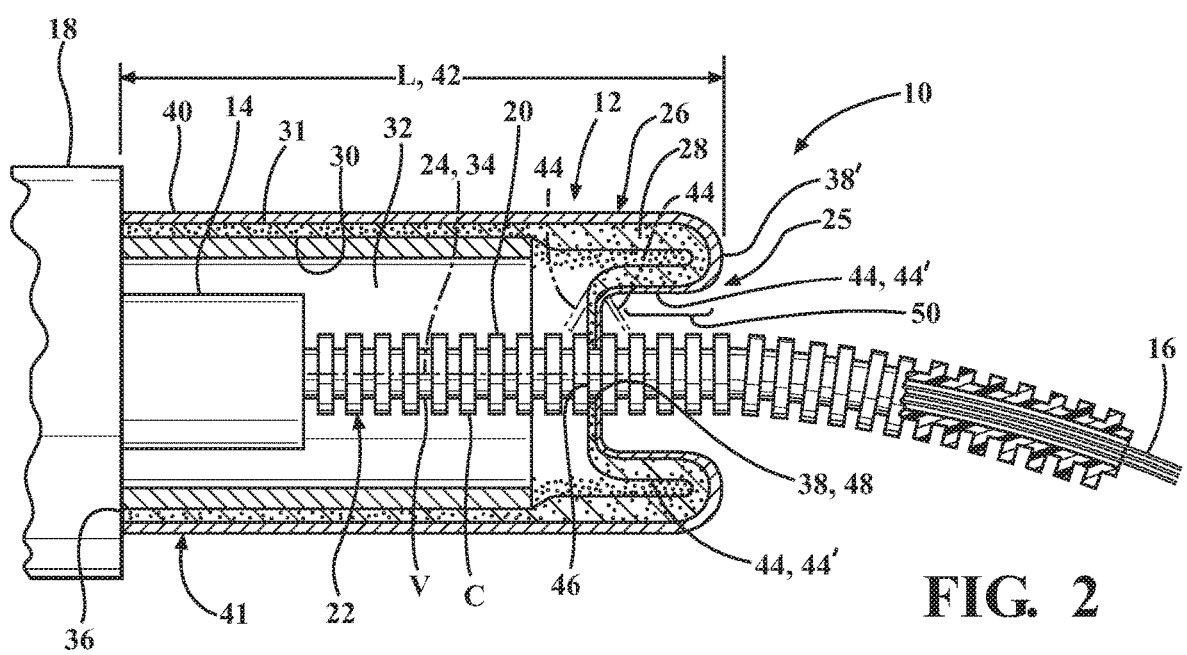
FIG. 2 is a cross-sectional side view of the thermal sleeve assembly of FIG. 1.

Referring in more detail to the drawings, FIGS. 1 and 2 show an assembly 10, including a thermal sleeve with integrally, monolithic positioning member, referred to hereafter as sleeve assembly or simply sleeve 12, constructed in accordance with one aspect of the invention, for protecting an electrical member 14 contained, at least in part, therein, such as sensor, against the effects of extreme radiant heat, abrasion, contamination and vibration, wherein the sensor 14 is shown connected to an end of a wire harness 16 and to an engine component 18 of a vehicle (FIG. 2). The wire harness 16 can be provided as a bundle of exposed, insulated wires or as a bundle of insulated wires enclosed within an outer protective sleeve, also referred to as tube 20, such as a tube having a generally smooth or convolute outer surface 22, by way of example and without limitation. The sleeve 12 is configured for slidable movement along a longitudinal axis 24 of the wire harness 16 and tube 20 thereof, if provided, to allow the sleeve 12 to be brought into its desired protective position about the sensor 14. The sleeve 12 is configured, via an integral positioning member 25, as discussed in further detail below, to remain fixed in its protective position until desired to selectively slide the sleeve 12 away from its protective position, such as may be desired to service the sensor 14. The sleeve 12 remains in its protective position during use, without need of secondary fasteners, such as tape or adhesives, and thus, assembly 10 is made simple, aesthetically pleasing, and economical in manufacture and use.

The sleeve 12 includes a tubular member 26 having an inner layer of insulative material forming an inner wall 28 with an inner surface 30 and an outer surface 31, with the inner surface 30 bounding an inner cavity 32 and extending along a central longitudinal axis 34 between opposite first and second free ends 36, 38, with the first end 36 and a reverse folded second end 38' defining an effective length L of a generally cylindrical portion 42 of the sleeve 12. The effective length L of the sleeve 12 can be constructed having any desired length, as desired for the intended application. The tubular member 26 further includes a reflective outer layer 40 to provide a reflective outer surface 41. The reflective outer layer 40 is fixed to the outer surface 31 of the inner wall 28, such that the entirety of an exposed outer surface of the sleeve 12 is reflective to radiant heat. The inner wall 28, in accordance with one aspect of the invention, can be constructed of any suitable insulating nonwoven, woven, knit, or braided material, wherein each of the aforementioned walls 28 can be constructed of non-heat-settable material, and can be constructed having any desired wall thicknesses, depending on the nature and severity of heat exposure in the intended environment.

The reflective outer layer 40 is provided to reflect extreme radiant heat typical of an engine compartment, including temperatures generated by an exhaust system. The outer layer 40 can be formed of any suitable metal material, including a metal foil layer of aluminum or other desired foil metals. The foil outer layer 40 is relatively thin, thereby allowing the sleeve 12 to remain flexible over meandering paths and corners, but thick enough to be bent and plastically deformed to maintain the "as bent" configuration. The outer layer 40 can be spiral wrapped or cigarette wrapped about the entirety of the outer surface 31 of the inner wall 28, as desired. Any suitable, heat resistant adhesive can be used to facilitate bonding the outer layer 40 to the outer surface 31 of the inner wall 28, if desired.

The integral positioning member 25 of the sleeve 12 is constructed as a monolithic piece, and thus, from the same piece of insulating and reflective layers 28, 40 forming the tubular member 26. The positioning member 25 includes a plurality of flexible, resilient fingers 44 that extend radially inwardly from a generally cylindrical portion 42 of the tubular member 26, which extends between the ends 36, 38', toward the central longitudinal axis 34 for abutment with the wiring harness 16, or the tube 20 thereof, if provided. The fingers 44 are flexibly resilient, such that the fingers 44 allow the wire harness 16 and tube 20 to pass freely through an opening 46 formed by free ends 48 of the fingers 44, wherein the free ends 48 of the fingers 44 also form the second free 38 end of the tubular member 26. The resiliency of the fingers 44 causes the fingers 44 to remain in abutment with the wire harness or tube 20 thereof, and thus, the sleeve 12 remains fixed in the desired assembled position relative to the wiring harness 16 and tube 20 thereof until some selected time when it may be desired to slideably remove the sleeve 12 from its assembled position. The fingers 44 are reverse folded and bent into the cavity 32, and as such, a portion 44' of the fingers 44, in combination with a portion of the generally cylindrical portion 42, form an annular, generally cylindrical dual-walled region 50, with the radially outermost generally cylindrical portion 42 acting as a backing or support to the radially inner portion 44' of the fingers 44, thereby providing the fingers 44 with support against excessive radially outward movement. As such, the retention function of the fingers 44 is enhanced, though the fingers 44 remain resilient to allow selective assembly and removal of the sleeve 12 from the wire harness, as shown in phantom in FIG. 2, when desired.

Figure 2A:
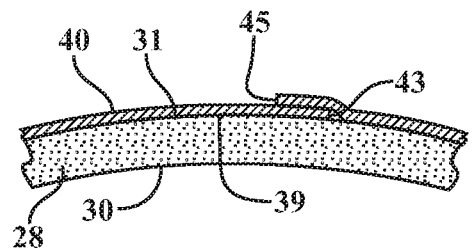
FIG. 2A is an enlarged partial cross-sectional side view of the thermal sleeve of FIG. 2.
Figure 3:
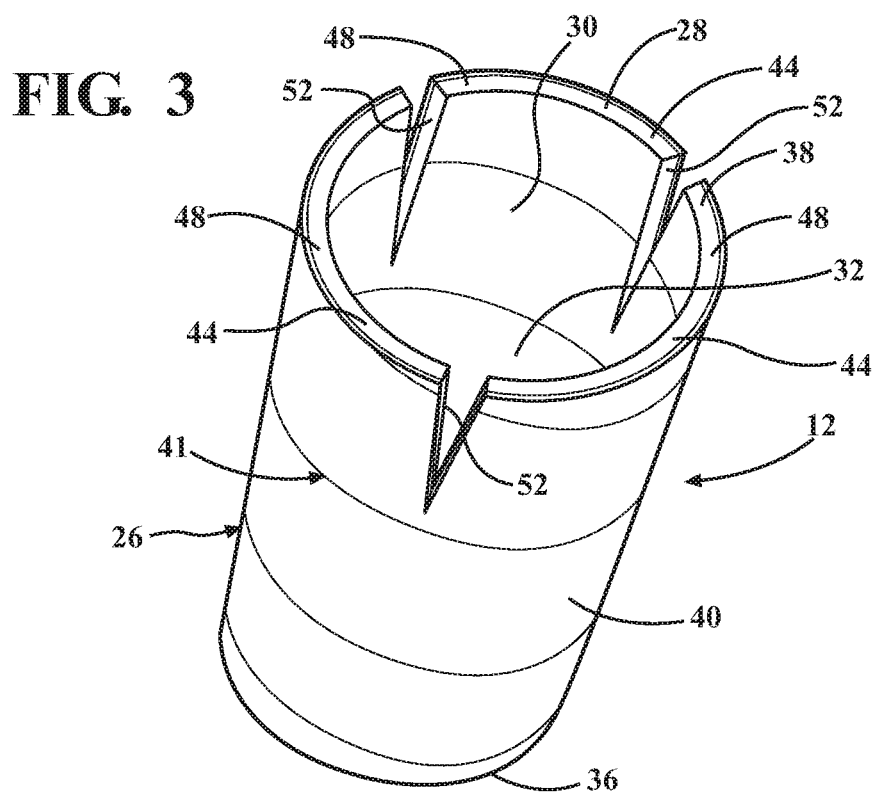
FIG. 3 is an isometric view of a thermal sleeve with positioning member in accordance with one aspect of the invention of the thermal sleeve assembly of FIG. 1 shown in a partially constructed state.
Figure 3A:
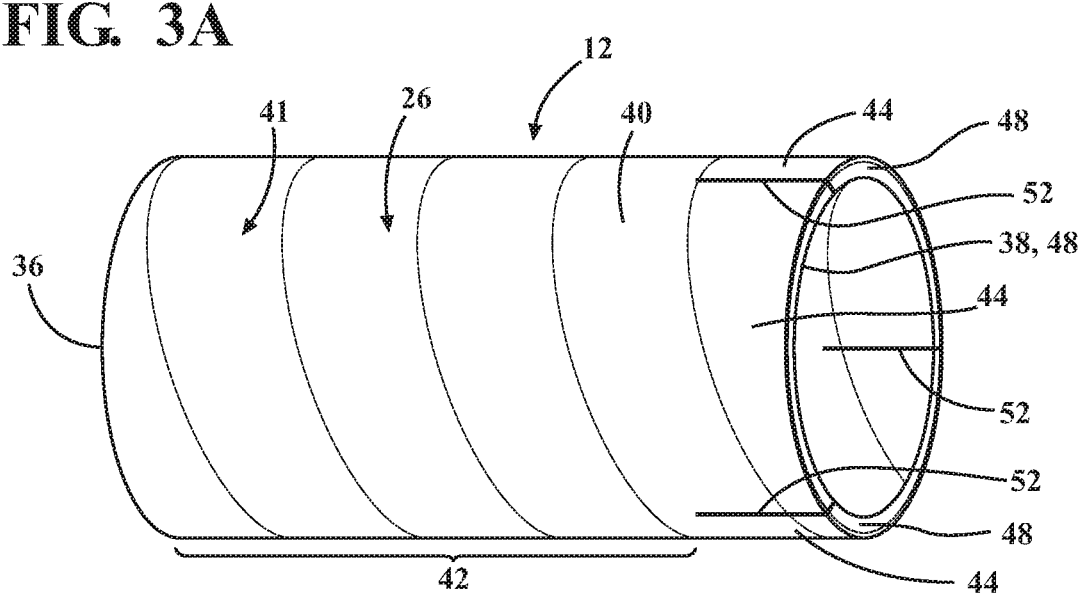
FIG. 3A is a schematic isometric side view of the partially constructed thermal sleeve with positioning member of FIG. 3.
Figure 4:
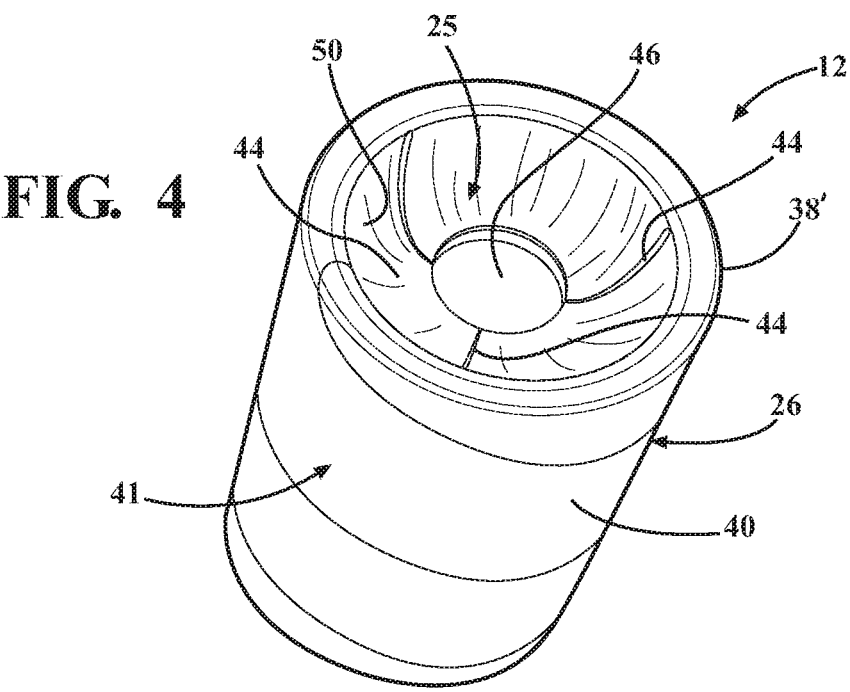
FIG. 4 is an isometric view of the thermal sleeve with positioning member of FIGS. 3 and 3A in a finished state.

In construction, the sleeve 12 is formed by forming tubular member 26 extending along a central longitudinal axis 34 between open first and second ends 36, 38, with the tubular member 26 including an inner wall 28 of insulative material and an outer layer 40 of reflective material fixed about the inner wall 28. It should be recognized that the outer layer 40 could be fixed to the inner wall 28 prior to forming the inner wall 28 into a tubular member 26. Further, the inner wall 28 can be formed as a circumferentially continuous, seamless wall, or, it can be formed having a lengthwise, generally straight or spirally wrapped and bonded butt seam. If the inner wall 28 is formed as a spiral wrapped wall, by way of example and without limitation, such as from a nonwoven material, the inner wall 28 is preferably spiral wrapped, wherein the opposite edges can be brought into flush abutting relation with one another, thereby forming a smooth butt joint 39, thereby forming smooth cylindrical inner and outer surfaces 30, 31. Then, the foil outer layer 40 can be wrapped about, in spiral (FIGS. 1, 3, 3A, 4) or cigarette fashion (FIG. 2A) with opposite edges 43, 45 brought into overlapping relation with one another, wherein the outer layer 40 can be mechanically fixed or bonded to the outer surface of the inner wall 28.

The method further includes forming a plurality of slits 52 extending lengthwise through the second end 38 toward the first end 36 to form a plurality of fingers 44, shown as three, by way of example and without limitation. Then, the fingers 44 are reverse folded and bent inwardly into the cavity 32 to form a generally cylindrical dual wall region 50, with the fingers extending radially inwardly from the dual wall region 50 toward the central axis 34 to their free ends 48. The finger free ends 48 form an outer periphery of an opening 46 sized for interference fit over an outer periphery of the wiring harness 16. As noted above, the outer layer 40 of reflective metal foil has a sufficient yield strength to maintain the fingers 44, including the insulative portion thereof, in their "as bent" configuration upon being formed and during use. Of course, with the fingers 44 being resilient, the free ends 48 spring radially outwardly and axially in opposite directions when confronted by the wiring harness 16, with the friction between the free ends 48 and the outer surface of the wiring harness 16 providing retention against unwanted relative axial movement between the wiring harness 16 and the sleeve 12 in use. As shown in FIG. 2, the fingers 44 are able to readily deflect resiliently, as shown in phantom on the right during assembly, and as shown in phantom on the left during removal, while returning resiliently to their original "as bent" radially inwardly extending configuration upon being received in a valley V or upon removal. Accordingly, when desired, a suitable axial force can be applied to the sleeve 12 to forcibly slide the sleeve 12 along the wiring harness 16 to allow access to the electronic member 14 during service. If a tube 20 is provided about the wire harness 16, such as a convolute tube, the free ends 48 of the fingers 44 can be deflected over annular crests C during installation and removal, wherein the fingers 44 can be constructed having a predetermined thickness to be at least partially received within annular valleys V between the crests C to facilitate maintaining the sleeve 12 in its intended "in use" position about the sensor 14.

Obviously, in light of the above teachings, many modifications and variations of the present invention are possible. It is, therefore, to be understood that within the scope of the appended claims, the invention may be practiced otherwise than as specifically described.

What is claimed is:

1. A thermal sleeve for protecting an electronic member operably connected to an elongate wiring harness, comprising:
    a tubular member including an inner layer of insulative material and an outer layer of reflective material, said tubular member extending along a central longitudinal axis between opposite ends, a plurality of slits extending lengthwise through one of said ends of said inner layer of insulative material and said outer layer of reflective material to form a plurality of fingers of said inner layer of insulative material and said outer layer of reflective material, said fingers extending radially inwardly toward said central longitudinal axis and forming an opening for receipt of the wiring harness therethrough, said fingers being configured to deflect resiliently in axially in opposite directions while sliding the thermal sleeve in opposite directions along the wiring harness.

2. The thermal sleeve of claim 1 wherein said tubular member has a generally cylindrical portion, said fingers being reverse folded into said generally cylindrical portion.

3. The thermal sleeve of claim 2 wherein a portion of said reverse folded fingers and said generally cylindrical portion of said tubular member abut one another in overlapping relation to form a generally cylindrical dual wall region of said tubular member.

4. The thermal sleeve of claim 3 wherein said dual wall region includes two separate layers of said insulative material substantially abutting one another and two separate layers of said reflective material spaced radially from one another by said two separate layers of said insulative material.

5. The thermal sleeve of claim 4 wherein said two separate layers of said insulative material are detached from one another.

6. The thermal sleeve of claim 2 wherein said generally cylindrical portion extends between opposite ends, said fingers extending radially inwardly from said generally cylindrical portion between, in axially spaced relation from, said opposite ends of said generally cylindrical portion.

7. The thermal sleeve of claim 1 wherein said insulative material is one of a nonwoven material, woven material, knit material or braided material.

8. A thermal sleeve in combination with a wiring harness configured in electrical communication with a sensor, comprising:
    a tubular member including an inner layer of insulative material and an outer layer of reflective material, said tubular member extending along a central longitudinal axis between opposite open ends, a plurality of slits extend lengthwise through one of said ends of said inner layer of insulative material and said outer layer of reflective material to form a plurality of fingers of said inner layer of insulative material and said outer layer of reflective material, said fingers extending radially inwardly toward said central longitudinal axis to form an opening for receipt of said wiring harness therethrough, said fingers being configured to deflect resiliently in axially in opposite directions while sliding the thermal sleeve in opposite directions along the wiring harness.

9. The combination of claim 8 wherein said tubular member has a generally cylindrical portion, said fingers being reverse folded into said generally cylindrical portion.

10. The combination of claim 9 wherein a portion of said reverse folded fingers and said generally cylindrical portion of said tubular member abut one another in overlapping relation to form a generally cylindrical dual wall region of said tubular member.

11. The combination of claim 10 wherein said dual wall region includes two separate layers of said insulative material substantially abutting one another and two separate layers of said reflective material spaced radially from one another by said two separate layers of said insulative material.

12. The combination of claim 11 wherein said two separate layers of said insulative material are detached from one another.

13. The combination of claim 9 wherein said generally cylindrical portion extends between opposite ends, said fingers extending radially inwardly from said generally cylindrical portion between, in axially spaced relation from, said opposite ends of said generally cylindrical portion.

14. The combination of claim 8 wherein said insulative material is non-heat-settable.

15. The combination of claim 8 wherein said wiring harness has a convolute outer surface and said fingers are configured to deflect in opposite axial directions over crests of said convolute outer surface and extend into valleys of said convolute outer surface.

16. A method of constructing a sleeve for protecting an electronic member connected to a wiring harness against exposure to heat, comprising:

providing a tubular member extending along a central longitudinal axis between open opposite ends, with the tubular member including an inner layer of insulative material and an outer layer of reflective material;

forming a plurality of slits extending lengthwise through one of the ends of the inner layer of insulative material and the outer layer of reflective material toward the other of the ends to form a plurality of fingers of the inner layer of insulative material and the outer layer of reflective material; and bending the fingers radially inwardly toward the central longitudinal axis, with free ends of the fingers forming an opening for receipt of the wiring harness therethrough, the fingers being configured to deflect resiliently in axially in opposite directions while sliding the thermal sleeve in opposite directions along the wire harness.

17. The method of claim 16 wherein the bending further includes reverse folding the fingers into the tubular member such that a portion of the fingers form a generally cylindrical portion extending about the central longitudinal axis and a portion of the fingers extend radially generally transversely to the central longitudinal axis.

18. The method of claim 16 further including forming the inner layer of insulative material as a nonwoven material.

19. The method of claim 16 further including forming the inner layer of insulative material as a woven material.

20. The method of claim 16 further including forming the inner layer of insulative material as a knit material.

21. The method of claim 16 further including forming the inner layer of insulative material as a braided material.

* * * * *